(12) United States Patent
Larue

(10) Patent No.: US 10,557,487 B2
(45) Date of Patent: Feb. 11, 2020

(54) LEVER-ACTUATED FIREARM ACCESSORY MOUNT HAVING TOOL-LESS CLAMP ADJUSTMENT

(71) Applicant: Mark C. Larue, Leander, TX (US)

(72) Inventor: Mark C. Larue, Leander, TX (US)

(*) Notice: Subject to any disclaimer, the term of this patent is extended or adjusted under 35 U.S.C. 154(b) by 166 days.

(21) Appl. No.: 15/894,855

(22) Filed: Feb. 12, 2018

(65) Prior Publication Data

US 2019/0249696 A1    Aug. 15, 2019

(51) Int. Cl.
 *F41G 11/00* (2006.01)
 *F16B 2/18* (2006.01)
 *F41C 27/00* (2006.01)

(52) U.S. Cl.
 CPC .............. *F16B 2/185* (2013.01); *F41C 27/00* (2013.01); *F41G 11/003* (2013.01)

(58) Field of Classification Search
 CPC .......... F41C 27/00; F41A 11/00; F16B 2/185; F41G 11/003; F41G 11/004
 See application file for complete search history.

(56) References Cited

U.S. PATENT DOCUMENTS

| | | | | |
|---|---|---|---|---|
| 2008/0092421 | A1* | 4/2008 | Beckmann | F41G 11/003 42/90 |
| 2008/0178511 | A1* | 7/2008 | Storch | F41C 27/00 42/90 |
| 2014/0373329 | A1* | 12/2014 | Volfson | F16M 13/02 29/428 |
| 2015/0020429 | A1* | 1/2015 | Savoy | F41G 11/003 42/111 |
| 2018/0340755 | A1* | 11/2018 | Cosentino | F41G 11/003 |

* cited by examiner

*Primary Examiner* — J. Woodrow Eldred

(57) ABSTRACT

In an accessory mount mechanism being releasably and adjustably assembled to the accessory mount rail of a firearm a lever-actuated clamping mechanism employs an upwardly facing clamping force adjustment member that is manually adjustable by the firearm user without the use of tools of any kind. A locking lever is pivotally mounted to a lateral platform of a mount base by means of an integral spindle shaft that projects upwardly from a cam plate that is fixed to the locking lever. The spindle shaft defines a non-circular section that is engaged by a corresponding non-circular drive receptacle of a drive washer member that is urged upwardly within an insert member of the mount base by a spring member. A manually actuated adjustment member is threaded to the spindle shaft and faces upwardly for ease of visual location and manual rotation by the user of the firearm.

1 Claim, 5 Drawing Sheets

LEVER-ACTUATED FIREARM ACCESSORY MOUNT HAVING TOOL-LESS CLAMP ADJUSTMENT

BACKGROUND OF THE INVENTION

Field of the Invention

The present invention relates generally to firearms and more particularly to firearms having accessory mounting rails. Even more specifically, the present invention concerns lever-actuated accessory mount devices that are intended to be releasably secured to a mounting rail of a firearm by clamping force at a selected position along the length of a mounting rail and are easily and efficiently removable from the accessory mounting rail and replaceable at the same or a different position as desired by the firearm user. The present invention also concerns adjustment mechanisms for accessory mounting devices that are designed for manual adjustment without the need for and sort of tool or implement to accomplish desired adjustment and present a manually actuated adjustment member that faces upwardly to permit ease of visual and manual access for adjusting the lever-actuated clamp member of the mount.

Description of the Prior Art

Firearm accessory mounts, such as are presented in U.S. Pat. Nos. 7,272,904, 7,908,782 and 8,510, 983 of Mark C. LaRue, each have lever-actuated clamp mechanisms for accessory mount devices that have adjustable clamp force to releasably and adjustably secure an accessory mount to the mount rail of a firearm. The clamping force of the accessory mount is adjustable by controlled rotation of an adjustment nut such as is shown at 60 in U.S. Pat. No. 7,272,904. The user of the firearm will employ any of a wide range of common tools or implements, such as a wrench, socket drive, pliers etc. to accomplish selective rotation of the adjustment nut or other adjustment device for rotational adjustment of a lever-actuated clamp mechanism to tighten or loosen its clamping force on the accessory mounting rail. It is envisioned that an adjustment mechanism for lever-actuated accessory mount clamping devices can be provided so that adjustment may be accomplished manually, without any need for the use of an adjustment tool. It is also envisioned that a manual clamp force adjustment mechanism may be located at position where it is easily visible to the user of the firearm and is readily accessible for manual gripping and rotation to accomplishing tightening or loosening of the clamping force of the clamp member against clamping surfaces of the accessory mounting rail.

SUMMARY OF THE INVENTION

It is a principal feature of the present invention to provide a novel firearm accessory mounting mechanism having an adjustable lever-actuated clamp device that is intended to be manually manipulated for adjustment of the clamping force of the lever actuated clamp member of the accessory mount device, without the need for an adjustment wrench or tool of any kind.

It is another feature of the present invention to provide a novel firearm accessory mounting mechanism having an adjustment mechanism for a mount clamping device, wherein the adjustment device is located at an upwardly facing position as viewed by the user of the firearm.

Briefly, the various objects and features of the present invention are realized through the provision of a firearm accessory mounting mechanism having lever-actuated clamping to an accessory mount rail of a firearm. The accessory mounting rail has oppositely angulated downwardly facing clamping surfaces that are engaged. The accessory mounting mechanism has a mount base having a laterally projecting locking or clamping platform within which a generally circular opening is formed. The lever-actuated clamping mechanism has a clamping force that is manually adjustable by rotation of an adjustment member that is threaded to an adjustment shaft of an adjustment spindle. The adjustment member is oriented upwardly so as to be easily visible by a user of the firearm and easily available for manual manipulation for tightening or loosening the clamping mechanism of the accessory mount. The adjustment member is of relatively large size for ease of grasping and defines a plurality of upwardly facing radiating vanes that facilitate manual grasping and rotation by the user of the firearm. The radiating vanes facilitate application of sufficient manual force for rotation of the adjustment member in either rotational direction for tightening or loosening of the lever-actuated clamping mechanism.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a side elevation view showing a firearm having an accessory mounting rail and having a sighting device or other accessory releasably mounted to the rail by means of an adjustable mount embodying the principles of the present invention;

FIG. 2 is an isometric illustration showing the top and side portions of a lever-actuated accessory mount having an upwardly facing rotary adjustment member to enable a firearm user to achieve manual adjustment of the clamping force of the clamping mechanism of the mount relative to the accessory mounting rail;

FIG. 3 is an isometric illustration showing the bottom and a side portion of the lever-actuated accessory mount of FIG. 2, particularly showing the lever-actuated clamp mechanism;

FIG. 4 is an isometric illustration showing the top and a side portion of the lever-actuated accessory mount of FIGS. 2 and 3, particularly showing the lever-actuated clamp mechanism and showing the upwardly facing clamp force adjustment mechanism;

FIG. 5 is an end elevation view showing end views of the mount rail and the pivot lever-actuated accessory mount of FIGS. 2-4 and particularly showing the tapered cam surface of the locking and adjustment clamp lever;

FIG. 6 is an exploded isometric illustration showing the various components of the pivot lever-actuated accessory mount of the present invention;

FIG. 7 is an isometric view showing the bottom surface of the manually Rotatable tool-less adjustment member of FIGS. 2, 4, 6 and 7; and FIG. 8 is an isometric illustration showing a top view of the drive washer member, showing an array of drive teeth that engage the teeth serrations of the clamp force adjustment member.

DETAILED DESCRIPTION OF PREFERRED EMBODIMENT

Figure 1:
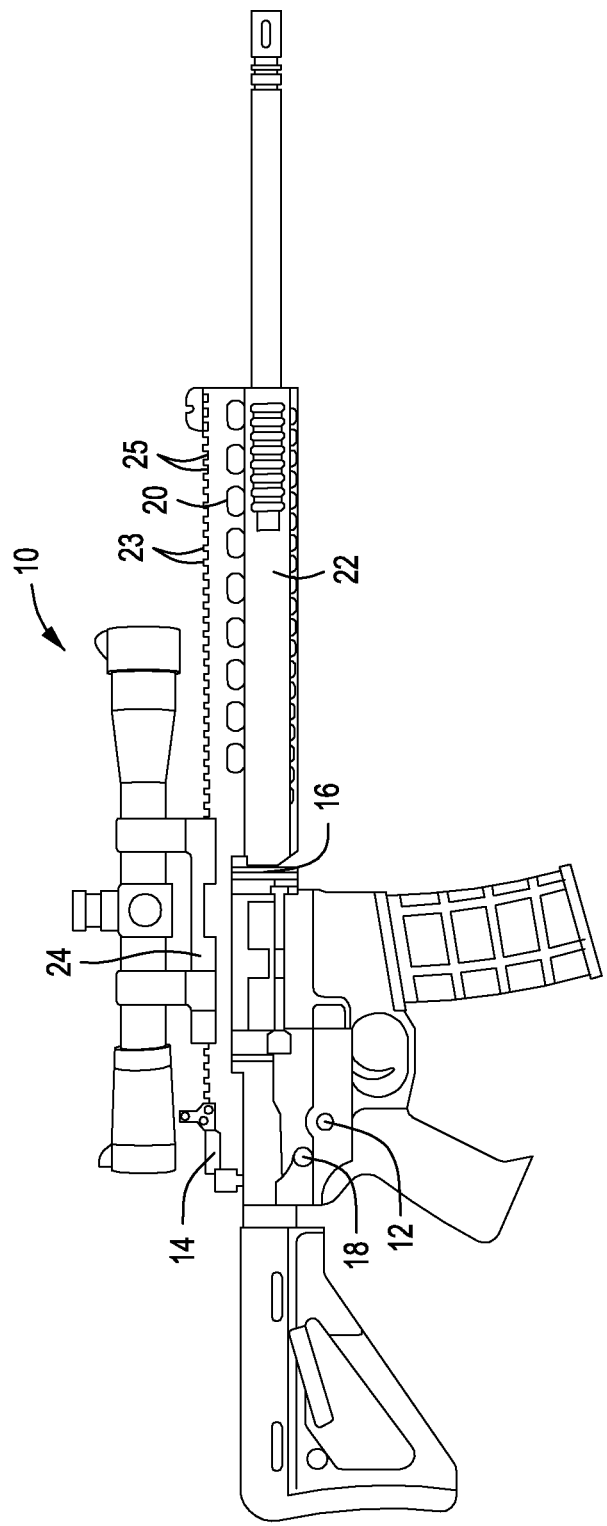

Referring now to the drawings and first to FIG. 1, a firearm, such as an AR15 gas actuated rifle manufactured and sold by LaRue Tactical, is shown generally at 10 and has a lower receiver 12 that is pivotally mounted to an upper receiver 14 by means of a pivot pin 16. A locking pin 18 is extended through matching locking holes of the upper and lower receivers to prevent pivotal movement of the upper and lower receivers until such pivotal movement is needed for cleaning and servicing of the firearm. An accessory mounting rail 20 is provided on the upper receiver and may extend along a handguard member 22 to provide for attachment of a mounting device 24 to the accessory mounting rail to permit various accessory members, such as various types of sighting devices to the accessory mounting device or devices permitting efficient use of the firearm. The accessory mounting rail is preferably of the Picatinny type, having substantially equally spaced transverse ribs or lugs 23 along its length which are separated by substantially equally spaced transverse grooves or slots 25.

Figure 2:
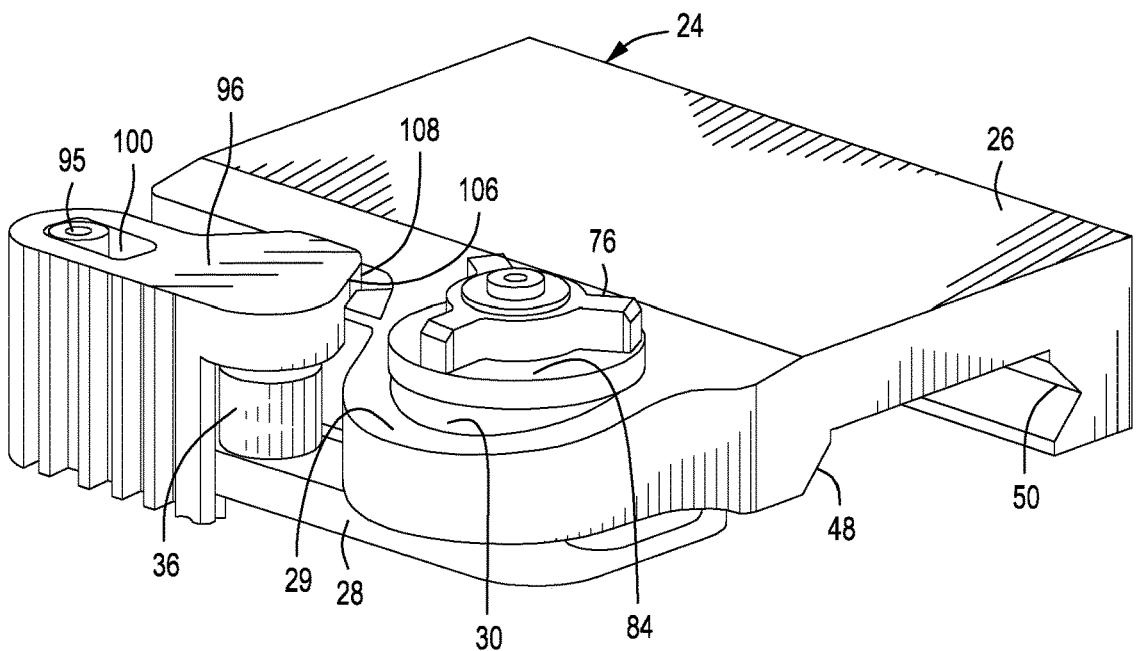

The accessory mounting device is shown generally at 24 in FIG. 2 and has a mount base 26 having an integral platform structure 28 projecting laterally from one side thereof. The integral platform structure 28 has a slightly tapered upper surface 29 and defines a generally circular opening 30 for installation of a pivotal locking lever 35 and having an internal generally circular upwardly facing shoulder 32 as shown in the exploded isometric illustration of FIG. 6. The circular shoulder 32 defines a slightly smaller bore 33 extending downwardly to a smaller diameter internal circular shoulder 34.

Figure 5:
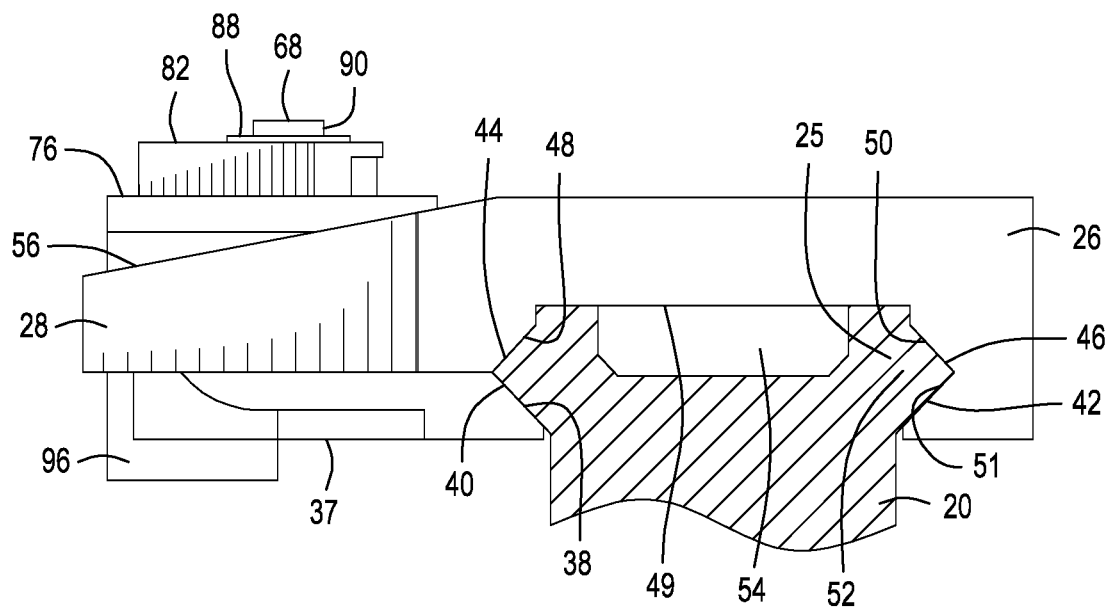
Figure 6:
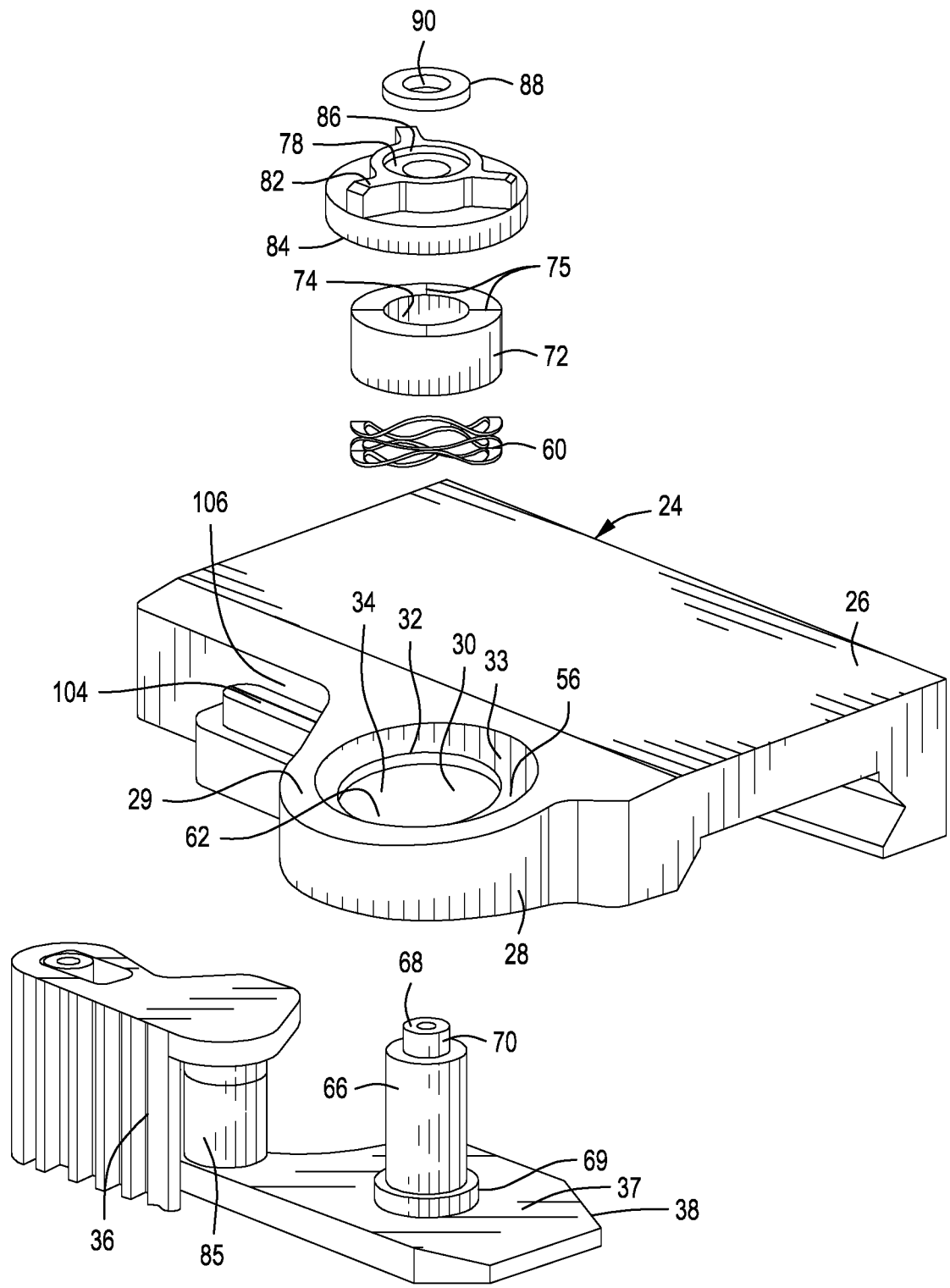

A cam actuating lever, also referred to as a locking lever is shown generally at 35 having an adjustment arm 36 is pivotally mounted to the integral platform structure 28 and, as shown in the isometric illustration of FIGS. 5 and 6, has a cam plate 37 that defines a tapered cam surface 38. The accessory mounting rail 20 of the firearm, as shown in the end view of FIG. 5, defines downwardly and inwardly angulated clamping surfaces 40 and 42 and also has upwardly and inwardly angulated surfaces 44 and 46 that are in juxtaposition with angulated internal surfaces 48 and 50 of the mount base member 26. The angulated surfaces 48 and 50, together with a downwardly facing generally planar surface 49, an undercut angulated surface 51 and the angulated cam surface 38 of the cam plate 37 define an elongate locking groove or channel 52 within which the accessory mounting rail 20 is received. The cam actuating lever 35 defines a lever arm 36 that is of sufficient length to permit manual application of clamping force for urging the clamping plate 37 tightly against the angulated undercut surface 40 of the mounting rail 20 to ensure against any movement of the accessory mount relative to the mounting rail as the firearm is used during a wide range of field conditions.

Within the elongate locking groove or channel 52 a mount positioning key member 54 projects downwardly from the mount base structure 26 and engages within a selected one of the transverse grooves or slots of the accessory mounting rail 20 to provide for precision location of the mount base structure 26 on the mounting rail 20. This feature permits the user of the firearm 10 to selectively locate the mount base structure 26 and any accessory, such as an optical or mechanical sighting device, at a selected position on the accessory mounting rail that is desired by the user. The clamping mount also permits the user to efficiently remove the mount base structure and its supported accessory from the mounting rail 20 and re-install the mount base structure and accessory at the same or a different location along the length of the mounting rail. The upwardly facing clamp adjustment member is designed to facilitate ease of visual inspection by a firearm user and is located for ease of grasping and manual rotation by the user even under conditions of poor light.

Figure 3:
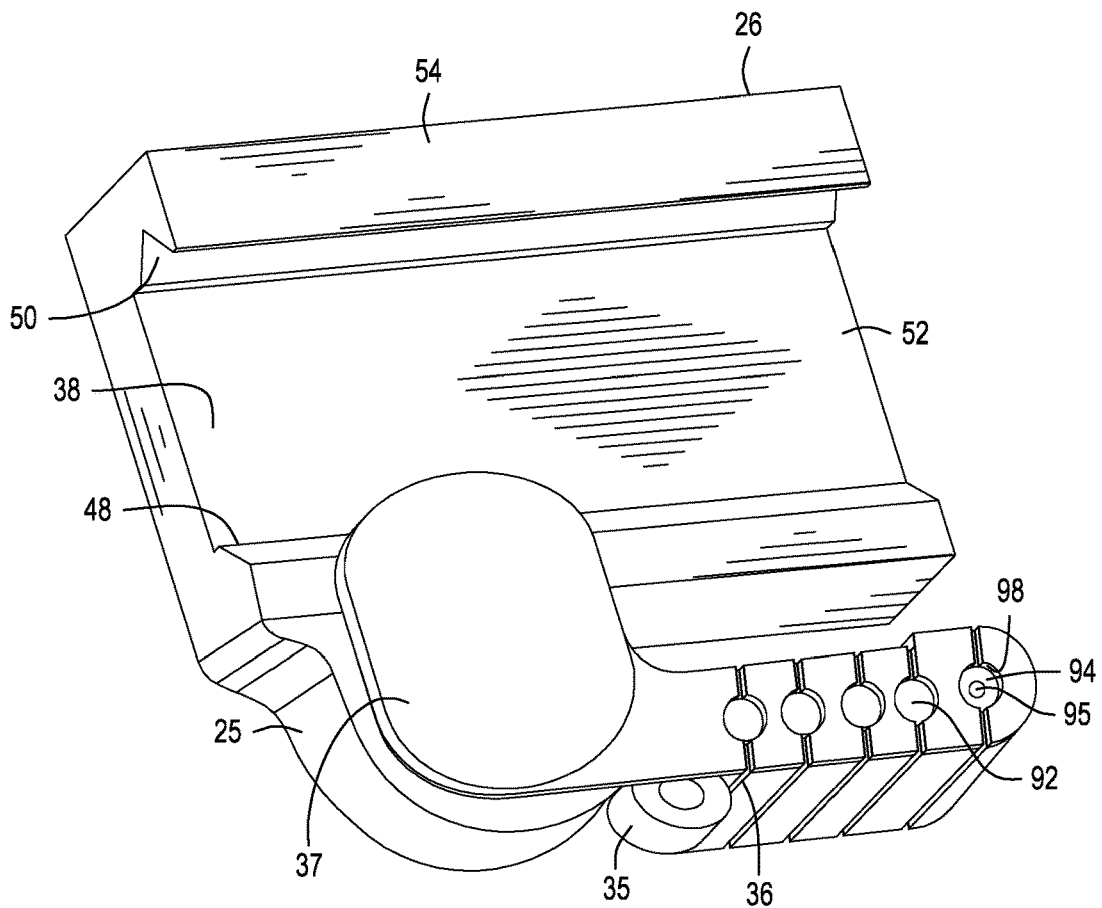

With reference to FIGS. 2, 3 and 5 the upwardly facing annular shoulder 32 may be defined by an annular insert 56, preferably composed of a hardened material such as stainless steel, which is positioned, i.e., press fitted within the generally circular opening 30 with a downwardly facing annular positioning shoulder 58 thereof in engagement with the internal generally circular upwardly facing shoulder 32 of the opening 30. A generally circular wave spring 60 is positioned within the central opening of the annular insert member 56 and is seated on an annular internal spring support shoulder 62 within the annular insert.

A pivot mount and adjustment spindle shaft member 66 projects upwardly from the cam plate member 37 as shown in exploded isometric illustration of FIG. 6 and is positioned within the central opening of the annular insert member 56 and the circular opening 30. The spindle shaft 66 has an upper end portion 68 defining external threads 70. The spindle shaft 66 has a lower section 67 that is of non-circular cross-sectional configuration; preferably of generally hexagonal configuration, defining a quick disconnect lever hex drive. This feature ensures that the adjustment spindle shaft member 66 is rotatable as well as linearly moveable within the insert 56. A drive washer member 72 defines an internal or female hex drive geometry 74 that mates with the internal hex drive geometry, thus causing driven rotation of the drive washer 72 when the clamp actuating lever 35 is manually rotated by the user of the firearm to tighten or loosen the clamp mechanism of the accessory mount as desired.

Figure 7:
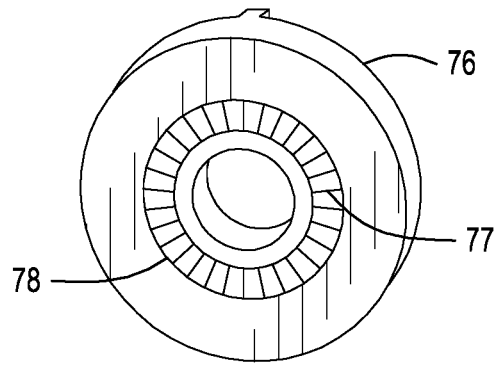
Figure 8:
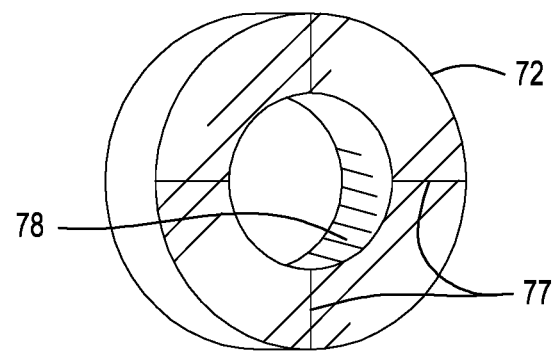

An upwardly facing rotary adjustment member 76 defines an internally threaded section 78 that receives the external threads of the upper end portion 68 of the spindle shaft. The drive washer 72 also defines an array of upwardly facing teeth 75 that are engaged by a downwardly facing circular array of ratchet teeth 77 of the upwardly facing clamp force adjustment member 76 as shown best in the bottom view of FIG. 7.

The drive washer is moveable linearly within the opening of the insert member 56 as the wave spring 60 is compressed or relaxed during clamping force adjustment as described in greater detail below. The drive washer member 72 is also rotatably moveable relative to the adjustment spindle member when the hex drive of the drive washer is not engaged with the hex section 67 of the spindle shaft 66. This condition occurs when the adjustment member 76 is rotated for loosening, allowing the wave spring 60 to move the drive washer linearly upward relative to the insert 32, thus disengaging the hex drive. This feature is also referred to as a quick disconnect which permits non-driving rotation of the locking lever 35 relative to the spindle shaft 66, without requiring complete disassembly of the locking lever components.

The clamp force adjustment member or knob 76 may be composed of a suitable metal material such as mild steel, stainless steel or may be composed of a lightweight durable alloy such as an aluminum alloy or a non-metal material such as any of a number of suitable polymer materials. It may be provided with a central insert 78 that is press-fitted or otherwise permanently secured within a central opening 80 of the adjustment member. A plurality of radiating rib members 82 project upwardly from a circular base member 84, thus providing a firearm user with a structure that can be efficiently gripped and rotated. The adjustment member or knob 76 is rotatable along with the locking lever 35 when the locking lever is rotated during locking or unlocking rotation. Above the upper end of the insert 78 the clamp force adjustment member or knob 76 defines a circular recess 86 within which is positioned a protective washer member 88 having a central circular opening 90. When the locking lever 35 and its components are installed within the circular opening 32 of the laterally extending platform 28 of the base member 26, the upper end 68 of the spindle shaft 66 extends through the central opening 90 of the washer member 88 and is exposed just above the adjustment member 76 and the protective washer member 88.

The generally circular panel 84 of the adjustment member 76 defines a generally circular downwardly facing array 78 of tooth-like members or other surface roughening features that establish engagement with the upwardly facing annular array of teeth 75 of the drive washer member 72 and cause the circular base 84 of the adjustment member to have movement resisting engagement with the teeth 75 of the drive washer member, causing the adjustment knob to be rotatable along with the locking lever 35. When the locking lever 35 is rotated to rotate the integral cam plate 37 of the locking lever the adjustment knob is rotated along with the locking lever. This feature permits the length of the actuating arm 36 of the locking lever 35 to provide additional mechanical advantage for rotation of the locking lever.

Figure 4:
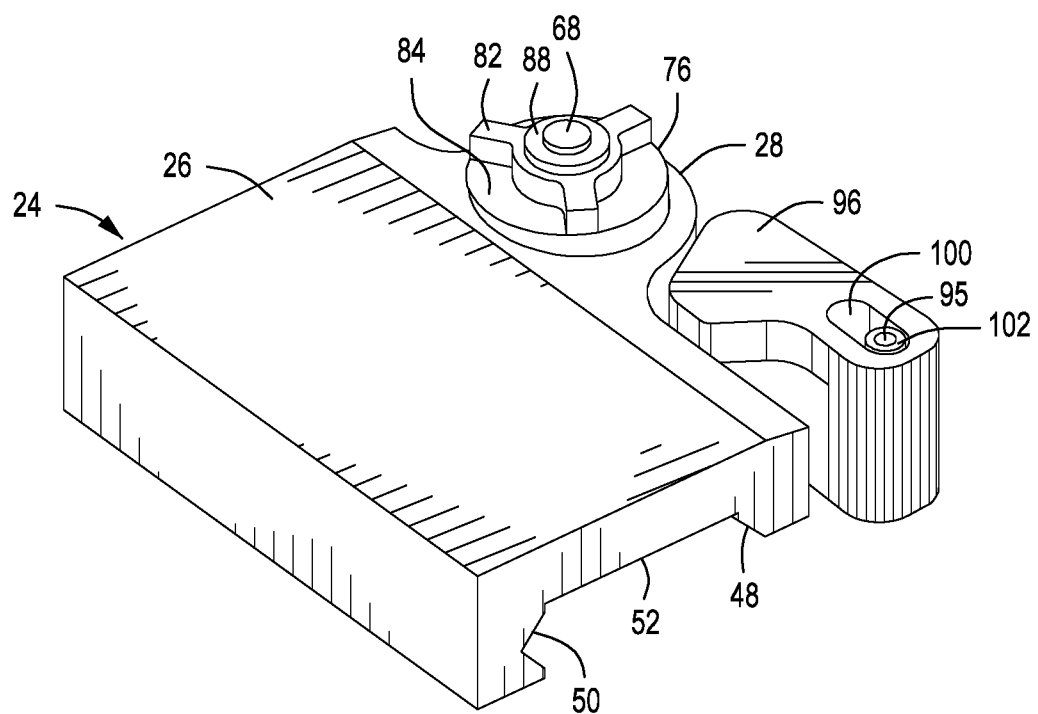

The adjustment arm 36 defines a plurality of holes 92 that are located along its length as shown in FIG. 3. A number of these holes 92 are provided simply to remove metal material and thus minimize the weight of the locking lever. One of these holes, 94 is provided to contain a roll pin member 95 as shown in FIGS. 4 and 5 that serves as a retainer and guide member for a lever locking member 96. Lever locking member 96 defines an elongate internal receptacle 98 within which the actuating arm 36 of the locking lever is received for relative linear movement. The lever locking member 96 also defines an elongate movement control slot 100 within which end portions 102 of the roll pin are positioned to permit linear movement of the lever locking member 96 that is limited by the length of the movement control slot 100 and to provide for stopping linear movement of the lever locking member.

The mount base member 26 defines a lateral locking projection 104 extending laterally from the platform structure 28 and defining a slot 106 within which a retainer portion 108 of the lever locking member 96 is received to secure the locking lever against inadvertent rotation. The lever locking member 96 may be retained at its lever securing position, as shown in FIG. 2 by means of the friction resistance of engaged surfaces or by any suitable detent member.

Operation

A user of the firearm and accessory mount disclosed herein will position the mount base 24 at any desirable location along the length of the accessory mount rail 20 of the firearm, with the mount positioning key member 54 engaged within a selected slot of the accessory mounting rail 20. The user will then rotate the locking lever 35 toward the locking position, engaging the tapered cam surface 38 of the cam plate 37 with a tapered surface 40 of the accessory mounting rail 20. If the engagement of the tapered cam surface 30 is too loose or too tight, the user of the firearm will simply grasp and rotate the adjustment member or knob 76 in the appropriate rotary direction for tightening or loosening the clamping force of the accessory mount on the accessory mounting rail. No tools of any kind will be needed for the clamping force adjustment process. The adjustment member or knob 76 is fairly large, and has upstanding radiating vanes 82 so that it is easily manually grasped and rotated by the user of the firearm. Since the adjustment member faces upwardly as seen by a firearm user, it is easily located even during conditions of poor light.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. An accessory mount for releasable and adjustable clamping assembly with the accessory mount rail of a firearm, comprising:
    a mount base member defining a lever mounting opening;
    a locking lever being pivotally mounted to said mount base at said lever mounting opening and having a cam plate defining an angulated cam surface for force transmitting clamping engagement with the accessory mounting rail;
    a spring member being positioned within said lever mounting opening;
    a drive washer being supported and urged upwardly by said spring member within said lever mounting opening and having a non-circular receptacle therein;
    a spindle shaft projecting upwardly from said cam plate and extending into said lever mounting opening and through said spring member and said drive washer, said spindle shaft having a non-circular driving section in driving relation with said non-circular receptacle of said drive washer; and
    an adjustment member having threaded connection with said spindle shaft and being manually rotatable by a user of the firearm for increasing or decreasing the clamping force of said cam plate with said accessory mounting rail.

* * * * *